United States Patent [19]

Dare et al.

[11] Patent Number: 4,975,039

[45] Date of Patent: Dec. 4, 1990

[54] FOOD MOLDING AND PORTIONING APPARATUS

[76] Inventors: Gary L. Dare, 85 Ellsworth, Colorado Springs, Colo. 80906; James E. Lehner, 13109 Westlake Rd., Vermilion, Ohio 44089

[21] Appl. No.: 408,885

[22] Filed: Sep. 18, 1989

[51] Int. Cl.$^5$ .......................... A21C 5/00; A21C 11/00
[52] U.S. Cl. ........................................ 425/238; 17/32; 425/257; 425/261; 425/347; 425/351; 425/583
[58] Field of Search ............... 425/583, 233, 238, 347, 425/350, 351, 259, 261, 257; 17/32

[56] References Cited

U.S. PATENT DOCUMENTS

| | | | |
|---|---|---|---|
| Re. 31,857 | 4/1985 | Holly | 17/45 |
| 1,651,040 | 11/1927 | Reilly . | |
| 2,820,247 | 1/1958 | Michaud | 17/32 |
| 2,852,809 | 9/1958 | Miles et al. | 425/583 |
| 2,939,407 | 6/1960 | Keathley, Sr. et al. | 107/15 |
| 3,488,798 | 1/1970 | Barnes, Jr. | 17/32 |
| 3,490,093 | 1/1970 | Mallas et al. | 17/32 |
| 3,535,735 | 10/1970 | Egee | 17/32 |
| 3,633,245 | 1/1972 | Partos | 17/32 |
| 3,654,665 | 4/1972 | Holly | 17/32 |
| 3,675,387 | 7/1972 | Lekan | 53/157 |
| 3,693,213 | 9/1972 | Holly | 17/32 |
| 3,747,160 | 7/1973 | Holly et al. | 17/32 |
| 4,054,967 | 10/1977 | Sandberg et al. | 17/32 |
| 4,097,961 | 7/1978 | Richards | 17/32 |
| 4,118,169 | 10/1978 | Haluska | 425/583 |
| 4,182,003 | 1/1980 | Lamartino et al. | 17/32 |
| 4,272,864 | 6/1981 | Holly | 17/32 |
| 4,302,868 | 12/1981 | Wagner | 17/32 |
| 4,317,259 | 3/1982 | Wagner | 17/32 |
| 4,329,828 | 5/1982 | Wagner | 53/122 |
| 4,338,702 | 7/1982 | Holly | 17/32 |
| 4,356,595 | 11/1982 | Sandberg et al. | 17/45 |
| 4,418,446 | 12/1983 | Sandberg et al. | 17/32 |
| 4,516,291 | 5/1985 | Goldberger et al. | 17/32 |
| 4,615,076 | 10/1986 | Shimokawa | 17/32 |
| 4,622,717 | 11/1986 | Bollinger | 17/32 |
| 4,697,308 | 10/1987 | Sandberg | 17/32 |

OTHER PUBLICATIONS

Koppens VM 400 brochure, Koppens Machinefabriek BV, Beekakker 11, Postbus 1, 5760 AA Bakel-Holland.
Bridge 3AP Food Shaper brochure, BMC Bridge Machine Co., Inc., Palmyra, NJ 08065.

(List continued on next page.)

*Primary Examiner*—Willard Hoag
*Attorney, Agent, or Firm*—Michael Sand Co.

[57] ABSTRACT

A molding and portioning apparatus is intended primarily for processing formable food products into individual portions of uniform shape, size and weight, while doubling output. The apparatus includes first and second spaced hoppers which receive a supply of a food product under a predetermined pressure, and discharge the product through a plurality of outlet openings formed therein. A plurality of pistons are slideably mounted within a plurality of cylinders which communicate with the hoppers and are aligned with and opposite of the outlet openings. Each piston is independently pneumatically biased in the direction of the hoppers under a certain pressure which is less than the predetermined pressure of the product, for generally equalizing the pressure applied to the product at each of the outlet openings. A slide plate is formed with first and second spaced sets of mold cavities which are alignable with the outlet openings of the first and second hoppers, respectively, as the slide plate reciprocates between first and second positions, for receiving and molding the discharged product into the individual portions. Knockout plungers are mounted intermediate the hoppers and reciprocate between retracted and extended positions, so that upon alignment of the first and second sets of filled mold cavities with the plungers when the slide plate is in the second and first positions, respectively, the portions are ejected from the cavities by the plungers and onto a conveyor at a common drop area, which carries the ejected portions to a subsequent step in the processing operation.

26 Claims, 6 Drawing Sheets

OTHER PUBLICATIONS

Hollymatic 8/65 Multi-Flow advertisement, Hollymatic Corporation, 600 E. Plainfield Rd., Countryside, Il. 60525.

Formax-12 advertisement, Formax, Inc., 19747 Wolf Rd., Mokena, Ill. 60448.

VersaForm II Forming Machine handbill, Packaging Research Corporation, 2582 So. Tejon St., Englewood, CO 80110.

Bridge Rotary Portion Former handbill, BMC Bridge Machine Co., Inc., Palmyra, NJ 08065.

Bridge Custom 150 HD Food Moulder handbill, BMC Bridge Machine Co., Inc., Palmyra, NJ 08065.

Bridge I-480 High Capacity Wide Belt Food Molder handbill, BMC Bridge Machine Co., Inc., Palmyra, NJ 08065.

Handtmann VF-10 Vacuum Stuffer Advertisement, TW Kutter 91 Wales Ave., P.O. Box 7, Avon, Mass. 02322.

FOOD MOLDING AND PORTIONING APPARATUS

BACKGROUND OF THE INVENTION

TECHNICAL FIELD

The invention relates to molding and portioning apparatus for formable materials and in particular to a food molding and portioning apparatus. More particularly, the invention relates to such a food molding and portioning apparatus in which individual shaped portions of substantially uniform size and weight are produced and product output generally is doubled over most prior art forming machines.

BACKGROUND INFORMATION

High-volume processing of formable foods such as ground beef, dough mixtures, cutlets, etc., is becoming an increasingly important aspect of food processing businesses for providing shaped and portioned products such as hamburger patties to retailers such as fast-food chains, supermarkets and restaurants. Most customers of formable food processors demand a competitively priced, high quality product which is uniform in shape, size and weight. The food processor must satisfy such requirements, and continue to find ways to further increase production efficiency and consistency for meeting growing demand and remaining competitive in the face of changing requirements.

However, two important shortcomings are present in most prior art food forming machines. First, many molding machines include a food supply hopper formed with a plurality of discharge openings, through which the formable food is forced under pressure into a reciprocating slide plate having a plurality of mold cavities formed therein. However, the pressure applied to the food at each of the discharge openings often varies significantly due to the differing distance of the openings from the point of entry of the food into the hopper. This pressure difference often causes the individual shaped portions of the food product to vary substantially in size and weight, which is an undesirable result for most customers.

Second, the number of mold cavities present in the reciprocating slide plates of most prior art molding machines is limited to one set which is alternately filled with the formable food and cleared by some type of reciprocating knockout plungers. To achieve profitable product outputs with such machines, the forming plate and other machine components must operate at high rates of speed. However, such high-speed operation causes increased wear and tear on the machine and often results in extended periods of machine downtime which ultimately slows production.

The closest known prior art to the present invention is disclosed in U.S. Pat. No. 2,820,247. However, this patent discloses a forming machine having a single feed station and a pair of formed product drop locations per forming plate, instead of a pair of feed stations and a single drop location as in our improved food molding and portioning apparatus. Moreover, this patent does not show, describe or even suggest the pressure balancing or equalizing feature of our invention which results in individual shaped food portions of generally uniform size and weight.

Other known prior art which is of interest but which is not believed to be particularly pertinent to the combination of features of our invention, is shown in U.S. Pat. Nos. 1,651,040, 2,939,407, 3,488,798, 3,490,093, 3,535,735, 3,633,245, 3,654,665, 3,675,387, 3,693,213, 3,747,160, 4,054,967, 4,097,961, 4,118,169, 4,182,003, 4,302,868, 4,317,259, 4,329,828, 4,338,702, 4,356,595, 4,418,446, RE 31,857, 4,516,291, 4,615,076, 4,622,717 and 4,697,308.

Thus, the need exists for an improved material molding and portioning apparatus which produces individual shaped portions of generally uniform size and weight, and which approximately doubles product output over most prior art forming machines.

SUMMARY OF THE INVENTION

Objectives of the present invention include providing a food molding and portioning apparatus having an output capacity which generally is double that of most prior art forming machines.

Another objective of the present invention is to provide such a food molding and portioning apparatus in which the individual shaped portions produced by the apparatus are generally uniform in size and weight.

A further objective of the present invention is to provide such a food molding and portioning apparatus which carries the individual shaped portions to a subsequent step in the food processing operation in an efficient, quick and orderly manner.

Still another objective of the present invention is to provide such a food molding and portioning apparatus which can be used to mold and portion various types of formable food products and other formable materials.

A still further objective of the present invention is to provide such a food molding and portioning apparatus which is portable and adapted for placement at various locations in a food processing line.

Another objective of the present invention is to provide such a food molding and portioning apparatus which can be used to produce individual shaped portions of up to two different formable food products and/or materials.

A further objective of the present invention is to provide such a food molding and portioning apparatus which is relatively inexpensive, durable in use, easy to operate, clean, and maintain, compact, and which effectively processes formable food products or materials under a variety of conditions including a wide range of product temperatures.

These objectives and advantages are obtained by the molding and portioning apparatus of the present invention, of the type intended for processing formable materials, the general nature of which may be stated as including, at least one hopper formed with at least one inlet opening for charging the hopper with a formable material by applying a predetermined pressure to said material, and a plurality of outlet openings for discharging the material from the hopper; means for generally equalizing the pressure applied to the material being discharged from each of the outlet openings of the hopper; a forming plate formed with at least a first set of mold cavities and being movable between a first position and a second position, the mold cavities being alignable with the outlet openings of the hopper when the forming plate is in the first position, for receiving and molding the discharged formable material into individual portions of generally uniform size and weight; knockout means alignable with the mold cavities of the forming plate when the plate is in the second position, the knockout means being movable between a retracted position and an extended position for ejecting the individual portions of the molded material from the mold cavities; and drive means for synchronously moving the forming plate between the first and second positions and the knockout means between the retracted and extended positions.

BRIEF DESCRIPTION OF THE DRAWINGS

A preferred embodiment of the invention, illustrative of the best modes in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
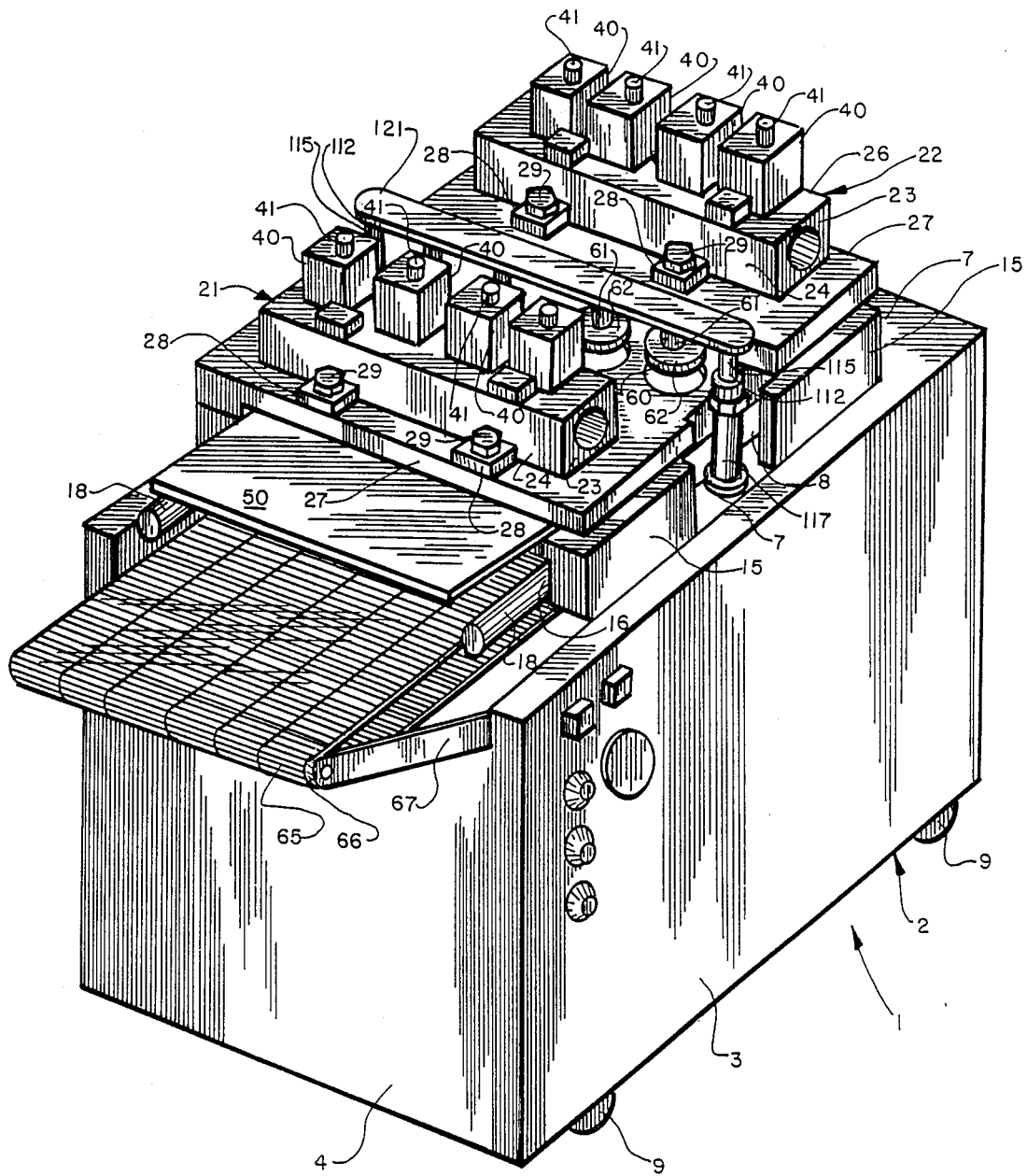
FIG. 1 is a perspective view of the improved food molding and portioning apparatus of the present invention.
Figure 2:
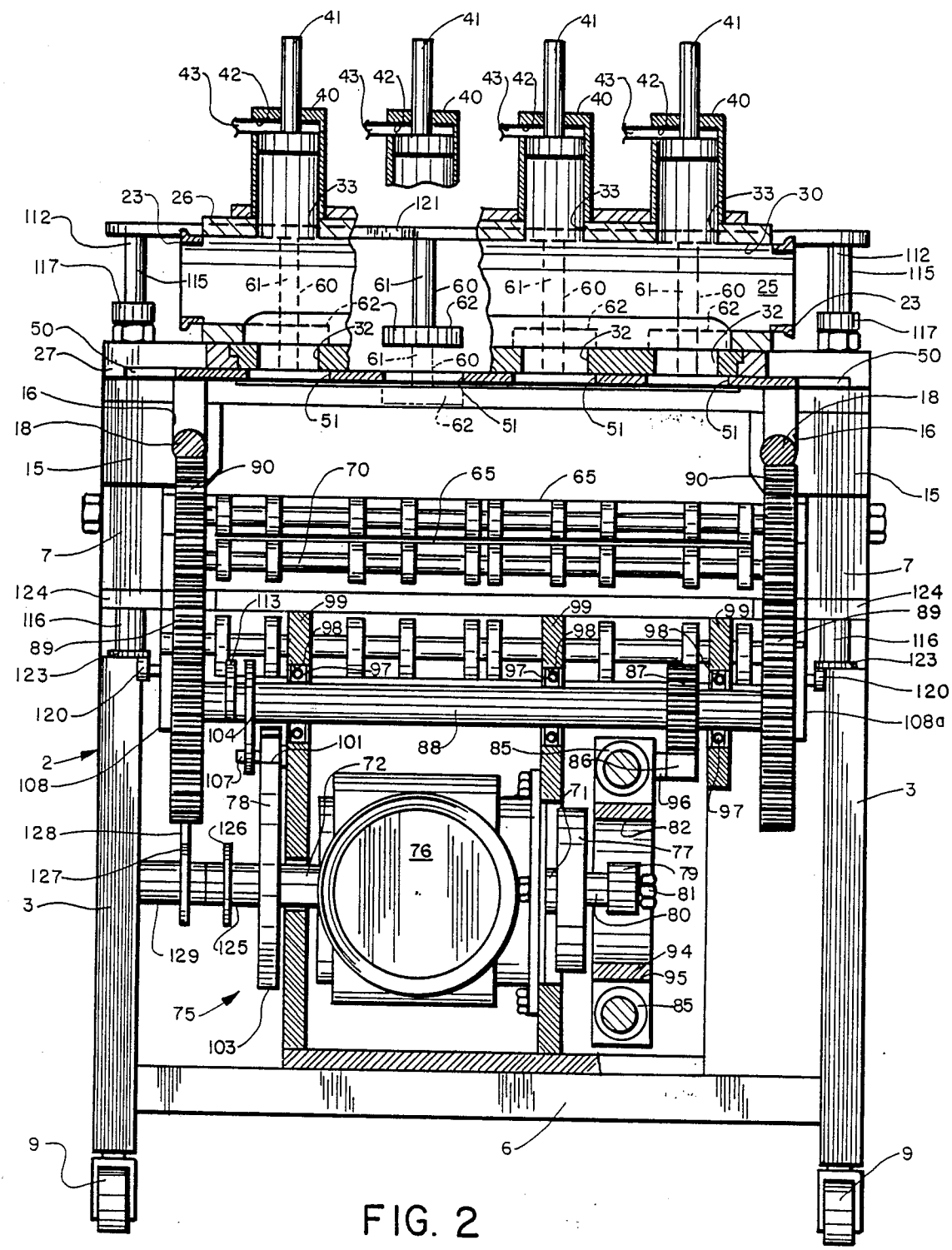
FIG. 2 is an enlarged fragmentary front view, with portions broken away and in section, of the food molding and portioning apparatus of FIG. 1.
Figure 3:
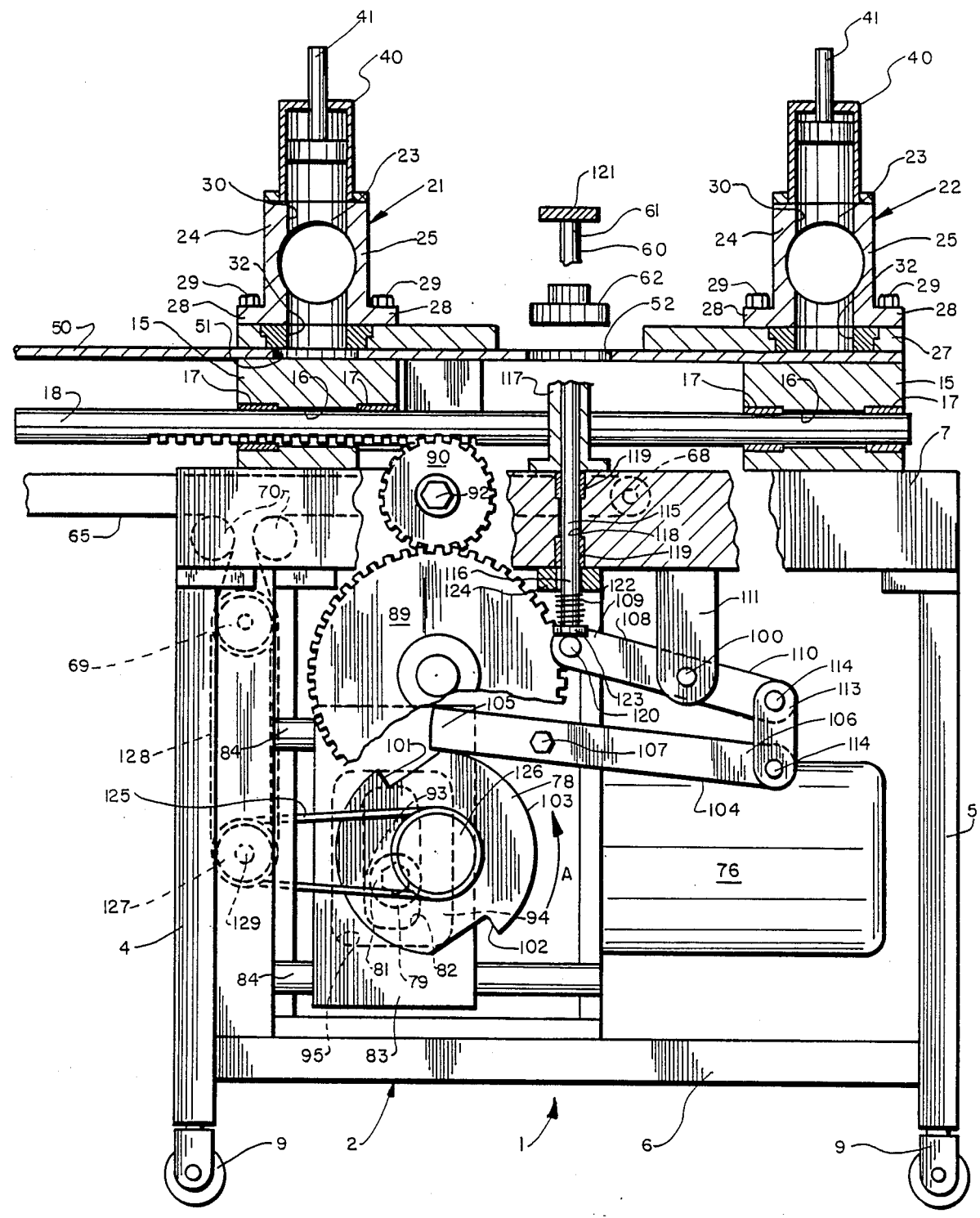
FIG. 3 is a fragmentary right-hand side view of the apparatus of FIG. 2, with portions broken away and in section, showing the slide plate in a first position and one of the knockout plungers in a retracted position.
Figure 4:
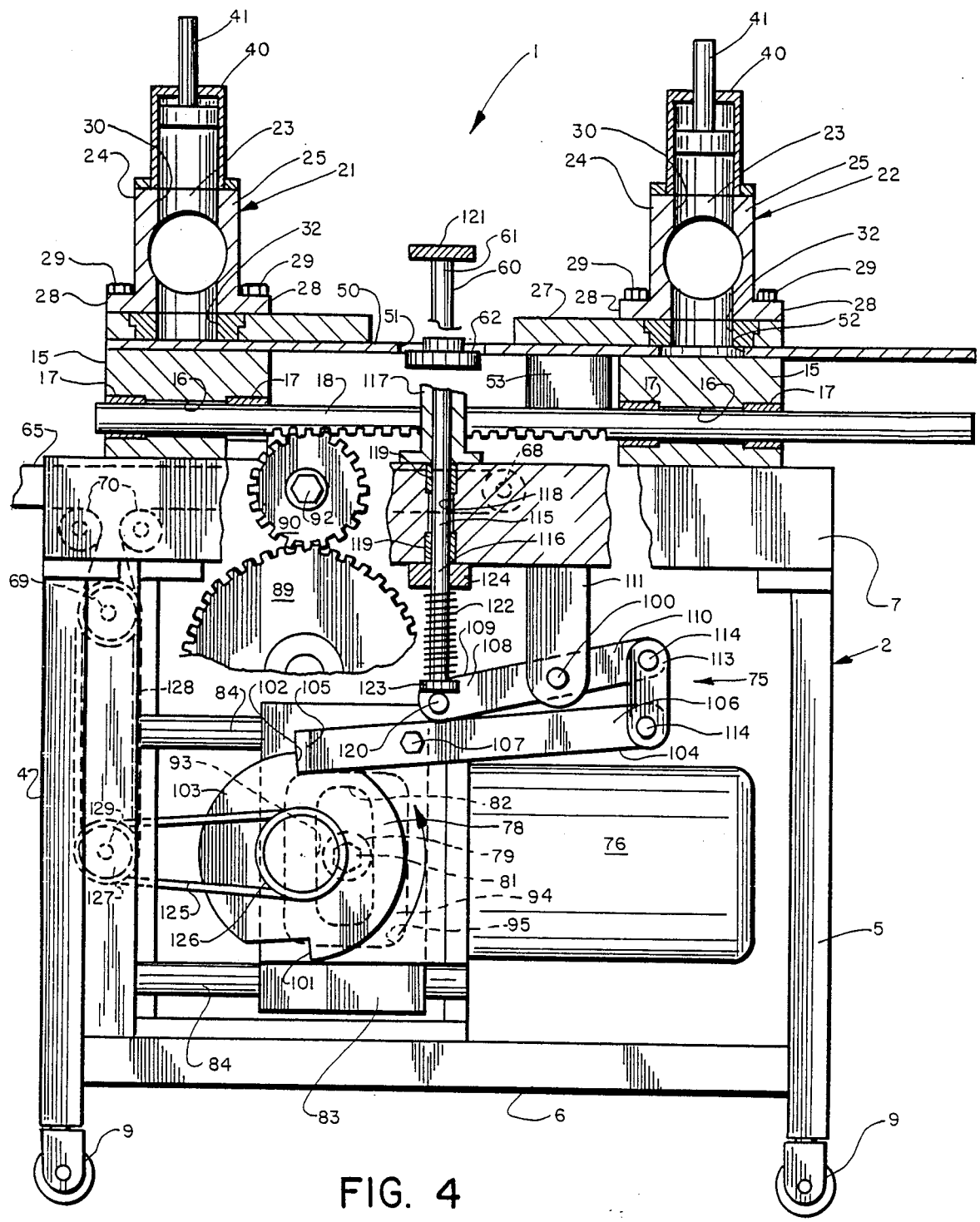
FIG. 4 is a view similar to FIG. 3, showing the slide plate in a second position and the knockout plunger in an extended position.
Figure 5:
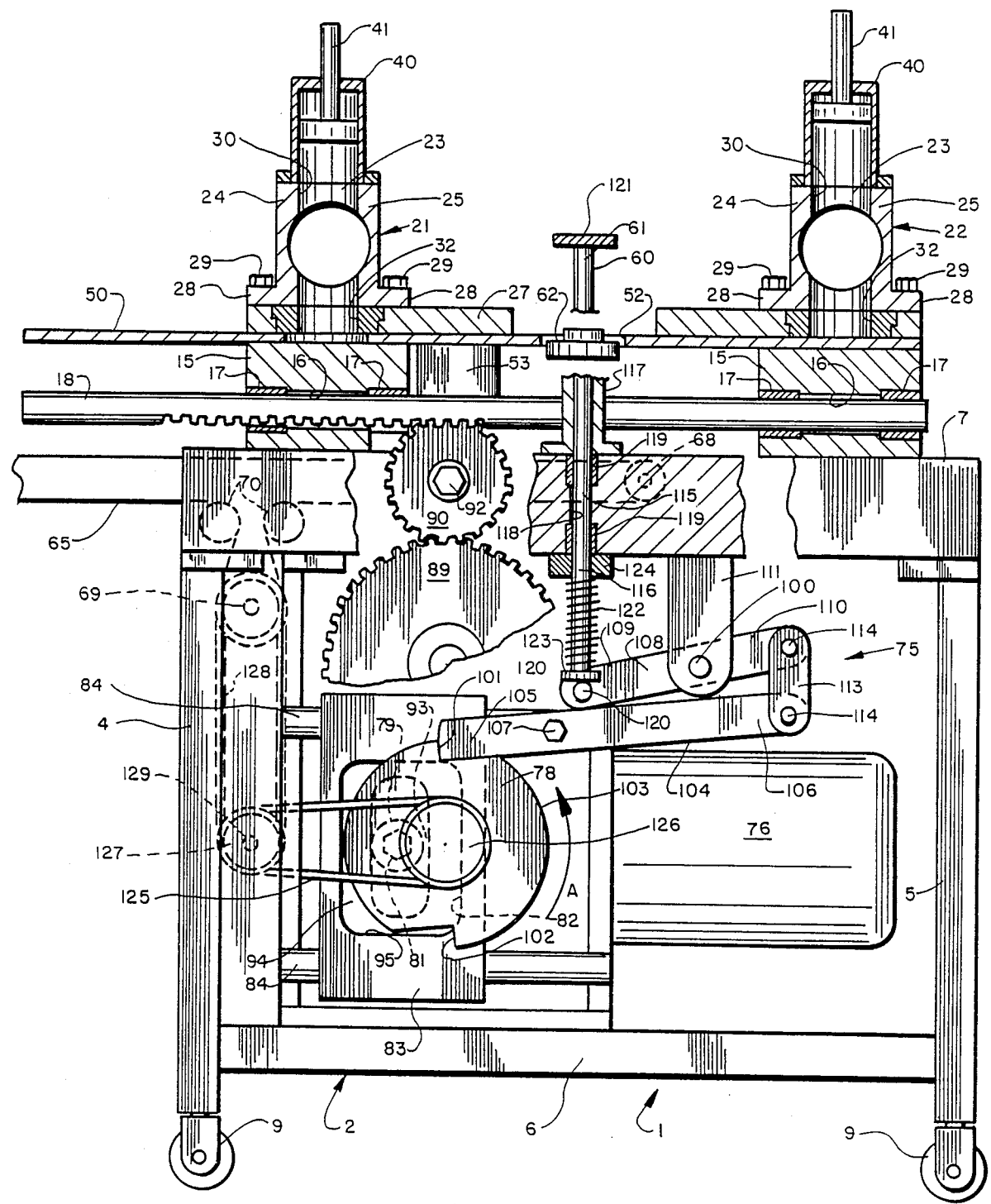
FIG. 5 is a view similar to FIG. 3, except showing the knockout plunger in the extended position.

The improved molding and portioning apparatus of the present invention is indicated generally at 1 and is shown in FIGS. 1 and 2, and in FIGS. 3-5 in various stages of operation. Molding and portioning apparatus 1 is intended primarily for use in producing individually shaped portions of formable food products having uniform size and weight such as hamburger patties, meatballs, dough mixtures, etc. However, if desired, apparatus 1 also can be used for molding and portioning other formable materials.

Apparatus 1 includes a rectangular-shaped housing, indicated generally at 2, which houses or supports the various components of the apparatus (FIGS. 1-3). Housing 2 comprises a pair of spaced parallel sidewalls 3, spaced parallel front and rear walls 4 and 5, a bottom wall 6, and a partial top wall 7 which defines an opening 8. A plurality of casters 9 are mounted on housing 2 for portability of apparatus 1.

A pair of guide blocks 15 are mounted in a spaced relationship on partial top wall 7 adjacent to each sidewall 3 of housing 2 (FIGS. 1-3). Each guide block 15 is formed with a longitudinally extending channel 16 having a pair of thrust bearings 17 mounted therein in a spaced relationship. Channels 16 of the respective pairs of guide blocks 15 mounted adjacent to each sidewall 3 are aligned. An elongated rack gear 18 is slideably mounted in thrust bearings 17 of each aligned pair of guide blocks 15, the purpose of which will be described in detail below in the description of the operation of apparatus 1.

In accordance with one of the main features of the present invention, front and rear hoppers, indicated generally at 21 and 22, respectively, extend transversely between and are mounted on the opposed front and rear guide blocks 15 by any suitable means such as welds (FIGS. 1-3). Since hoppers 21 and 22 are similar in construction and operation, only hopper 21 will be described below. Hopper 21 generally is rectangular-shaped and includes a pair of spaced parallel end walls 23, spaced parallel front and rear walls 24 and 25, a top wall 26, and a bottom wall 27 which is attached by bolts 29 to pairs of outwardly extending flanges 28 formed integrally with the front and rear walls. End, front, rear, top and bottom walls 23-27, respectively, generally define a supply chamber 30.

An inlet opening 31 is formed in each end wall 23 of hopper 21 (FIGS. 1-3) for charging chamber 30 with a formable material conveyed through a feed conduit (not shown). A pair of opposed inlet openings 31 is provided in hopper 21 so that apparatus 1 can be properly positioned in a processing line without regard to the side on which the feed line is located. That is, the inlet opening 31 located on the same side as the feed line will receive the feed line, and the opposite inlet opening 31 will be capped. A plurality of spaced outlet openings 32, preferably four, are formed in bottom wall 27 of hopper 21 for discharging material from chamber 30, and four openings 33 are formed in top wall 27 of the hopper and are vertically aligned with lower openings 32.

In accordance with another important feature of the present invention, four cylinders 40 are mounted on top wall 26 of hoppers 21 and 22 in alignment with openings 33 (FIGS. 1-3). Each cylinder 40 communicates with chamber 30 of its respective hopper and has a piston 41 slidably mounted therein. Each cylinder 40 is formed with an opening 42 which communicates with a pressurized air source (not shown) through a separate conduit 43, whereby each piston 41 is independently pneumatically controlled for generally equalizing or balancing the pressure applied to the material being discharged from each outlet opening 32 of hoppers 21 and 22.

A forming or slide plate 50 is formed with first and second longitudinally spaced sets of mold cavities 51 and 52, respectively, for receiving and molding the discharged formable material into individual portions of generally uniform size and weight (FIGS. 1-3). Slide plate 50 is attached to rack gears 18 by a pair of lugs 53 which each extend between and are attached to the slide plate and a respective one of the gears, for mounting the slide plate adjacent to and below hoppers 21 and 22.

Four knockout plungers 60 are movably mounted, in a manner described in detail below, in a transverse spaced relationship intermediate of and an equal distance from outlet openings 32 of each of the hoppers 21 and 22 (FIGS. 1-3). It is important to note that a distance between the spaced sets of mold cavities 51 and 52 is equal to the distance between the knockout plungers 60 and the outlet openings 32 of each of the hoppers 21 and 22. Each plunger 60 comprises a rod 61 and a knockout cup 62. The outside diameter of cups 62 is slightly less than the inside diameter of mold cavities 51 and 52, for ejecting the individual portions of the shaped material from the mold cavities during the operation of apparatus 1.

An endless conveyor chain belt 65 (FIGS. 1-3), of a type which is well-known in the food processing art, is movably mounted below slide plate 50. More particularly, conveyor belt 65 is movably mounted on and extends between a front roller 66 which extends between and is rotatably mounted on a pair of frontwardly extending arms 67 which in turn are mounted on housing 2, a rotatably mounted rear roller 68 (FIG. 3) which is mounted in the same horizontal plane as front roller 66, and an intermediate rotatably mounted roller 69 which is offset downwardly from rollers 66 and 68. The offset location of intermediate roller 69 with respect to horizontally aligned front and rear rollers 66 and 68, together with a pair of tensioning rollers 70 rotatably mounted adjacent to intermediate roller 69, provides tension to conveyor belt 65 so that the belt can catch the individual portions of molded material ejected from mold cavities 51 and 52 of slide plate 50, at a common drop area and carry the portions to a subsequent step in the material processing operation.

A drive system, indicated generally at 75 and shown in FIGS. 2 and 3, synchronously reciprocates slide plate 50 between a first position and a second position as shown in FIGS. 3 and 4, respectively, and reciprocates knockout plungers 60 between a retracted and an extended position. Drive system 75 also continuously drives conveyor belt 65. Drive system 75 substantially is contained within housing 2 and is powered by an electric motor 76, preferably of the right angle gear type, having first and second drive shafts 71 and 72 which extend sidewardly therefrom in opposite directions. Drive shafts 71 and 72 are operatively connected to a disk 77 and a wheel 78, respectively, for rotating the disk and wheel. The rotational motion of disk 77 and wheel 78 are transformed into the synchronized reciprocating motion of slide plate 50 and knockout plungers 60, respectively.

Figure 6:
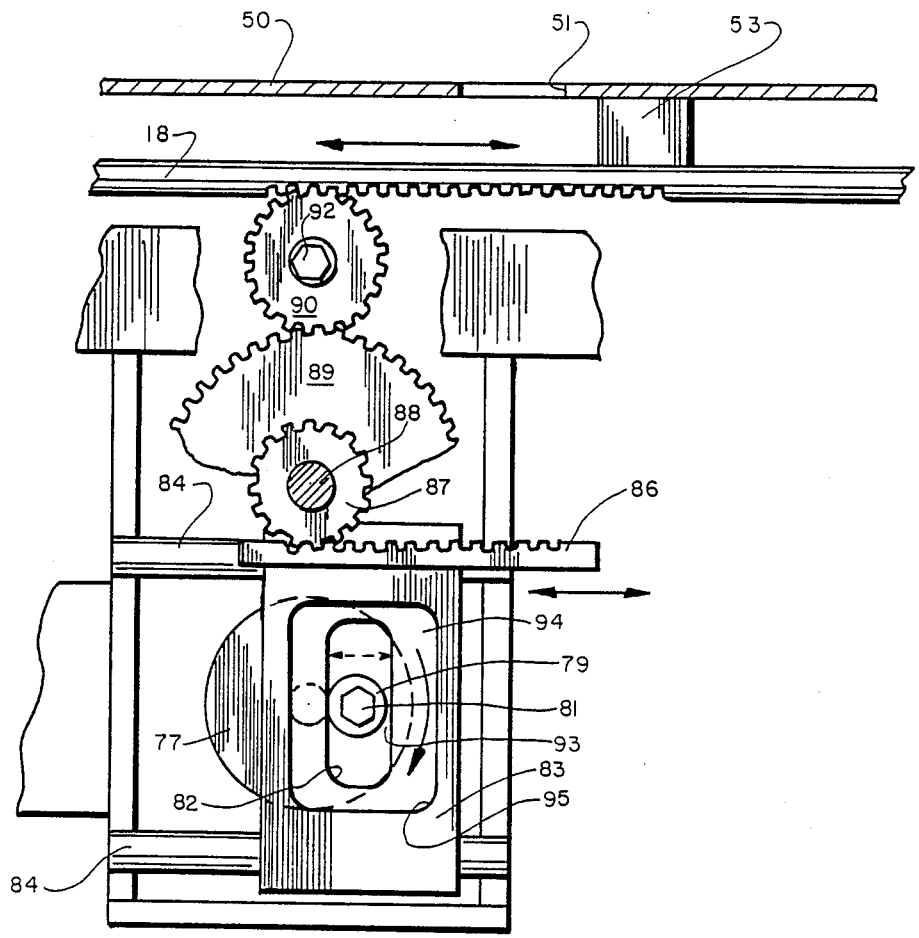
FIG. 6 is a diagrammatic view similar to FIG. 4, particularly showing the components of the drive system of the apparatus of the invention which reciprocate the slide plate.

With particular reference to FIGS. 2, 3 and 6, reciprocating slide plate 50 is moved in the following manner. A cam follower 79 is eccentrically mounted on disk 77. Cam follower 79 is secured by a nut 81 to a shaft 80 which is attached to and extends outwardly of disk 77. Cam follower 79 runs in an oval-shaped cam slot 82 formed in a slide carriage 83 which is slideably mounted on a pair of vertically spaced rails 84 by a plurality of thrust bearings 85. More specifically, cam slot 82 is formed in an insert 94 which in turn is fitted in an opening 95 formed in slide carriage 83. The rotary movement of cam follower 79 within cam slot 82 transforms the rotary motion of disk 77 into a reciprocating motion of slide carriage 83 along rails 84. A rack gear 86 is attached to slide carriage 83 by a bracket 96 and meshes with a pinion gear 87. Pinion gear 87 in turn is mounted on and rotates a drive shaft 88 which is rotatably mounted in a plurality of transversely spaced, horizontally aligned bearings 97. Bearings 97 in turn are mounted in respective aligned openings 98 formed in a plurality of transversely spaced vertical guide plates 99. A pair of pinion gears 89 are mounted on the ends of drive shaft 88 and mesh with another pair of pinion gears 90 which are each rotatably mounted on partial top wall 7 of housing 2 by a nut 91 and a bolt 92. Rotating pinion gears 90 in turn mesh with rack gears 18 for driving the rack gears and attached slide plate 50 in a reciprocating motion.

It is important to note that a length "1" of the short axis of oval cam slot 82, indicated by dot-dash lines in FIG. 6, is greater than the diameter of cam follower 79. Due to this differential between the diameter of cam follower 79 and length "1", a clearance or gap 93 exists between cam follower 79 and the elongated edge of cam slot 82 opposite from the edge on which the cam follower is running. This gap 93 causes reciprocating slide plate 50 to accelerate during movement between the first and second positions shown in FIGS. 3 and 4, respectively, and then to decelerate and pause or dwell at the first and second positions, to provide time for the filling of mold cavities 51 and 52 of slide plate 50 and simultaneous ejection of the shaped material from mold cavities 52 and 51, respectively, by knockout plungers 60.

The rotary motion of wheel 78 is transformed into the reciprocating motion of knockout plungers 60 in the following manner. First and second opposed notches 101 and 102 are formed in peripheral edge 103 of wheel 78 (FIGS. 2 and 3). A cam lever 104 having first and second ends 105 and 106, respectively, is pivotally mounted adjacent to wheel 78 by a bolt 107. A lever 108 having first and second ends 109 and 110, respectively, is pivotally mounted above cam lever 104 on one end of a transversely extending shaft 100, which in turn is pivotally mounted in a pair of transversely spaced depending brackets 111. A similar lever 108a is pivotally mounted on the other end of shaft 100. Second end 106 of cam lever 104 is pivotally attached to second end 110 of lever 108 by a connecting link 113 and a pair of pins 114.

A plunger 115 is movably mounted adjacent to each sidewall 3 of housing 2. Since plungers 115 are constructed and operate similarly, only one will be described below. Plunger 115 has an upper end 112 and a lower end 116, and is vertically slideably mounted in opening 118 formed in top wall 7 of housing 2 by a pair of spaced thrust bearings 119, and passes completely through the opening. Plunger 115 is further stabilized by a guide member 117 mounted on top wall 7 in alignment with opening 118. Plunger 115 is biased in a downward direction by a usual compression spring 122 which is coiled about its lower end 116 and captured between a flange 123 formed on the lower end and a guide member 124 attached to the bottom surface of top wall 7 in alignment with opening 118. A sidewardly extending pin 120 is attached to first end 109 of each of the levers 108 and 108a, for engaging flange 123 of its respective plunger 115 for moving the plunger as described below. Spring 122 maintains contact between each pin 120 and flange 123 of its respective plunger 115. The upper end 116 of each plunger 115 is attached to a cross plate 121 which in turn is attached to rod 61 of each knockout plunger 60, so that movement of plungers 115 will cause simultaneous movement of plungers 60.

In operation, cam lever 104 abruptly drops off of peripheral edge 103 of wheel 78 and into notch 101 as shown in FIG. 5 when slide plate 50 is at rest in the first position, which in turn allows plungers 115 to move downward in the direction of their bias due to the simultaneous downward movement of first end 109 of levers 108 and 108a. This downward movement of plungers 115 causes attached cross plate 121 and knockout plungers 60 to move downward into an extended position, so that knockout cups 62 of plungers 60 move within aligned second mold cavities 52 of slide plate 50 for ejecting the shaped material therefrom. As disk 78 continues to rotate in the direction of arrow "A" as shown in FIG. 3, end 105 of cam lever 104 moves upward out of notch 101 and runs along peripheral edge 103 of the disk. This upward movement of cam lever end 105 out of notch 101 causes plungers 115 to move upward against their bias due to the upward movement of end 109 of levers 108 and 108a. Cross plate 121 in turn moves upward with attached plungers 115, thus pulling knockout cups 62 of attached plungers 60 upward and out of mold cavities 52. The cycle is repeated for mold cavities 51 when cam lever drops off of peripheral edge 103 of wheel 78 and into notch 102, as shown in FIG. 4 when slide plate 50 is at rest in the second position and mold cavities 51 are aligned with knockout plungers 60.

Drive system 75 also continuously moves conveyor belt 65 in the following manner. An endless drive belt 125 extends between and operatively connects a pulley 126 which is mounted on second drive shaft 72 of motor 76, and a shaft 129 rotatably mounted on housing 2 and having a pulley 127 mounted thereon pulley 127 is rotated by shaft 129 and in turn is operatively connected to intermediate roller 69 by an endless drive belt 128 which extends therebetween.

The improved food molding and portioning apparatus of the present invention begins operating when motor 76 is activated. For descriptive purposes, ground beef will be referred to hereafter as the formable material or food product used with apparatus 1. A pressure pump of a type which is well-known in the art forces the ground beef through a feed line and inlet openings 31 of hoppers 21 and 22 to charge chambers 30 with the ground beef. Hoppers 21 and 22 can be charged with the same formable material as described herein through a Y-connector which couples the feed line with inlet openings 31, or each hopper can be charged with different materials through separate feed lines, if desired.

Since pressure equalizing pistons 41 operate similarly in hoppers 21 and 22, only the action of the pistons of hopper 21 will be described herein. The pressure pump applies a predetermined pressure to the ground beef to force the beef through the feed line and into the hopper. Although this predetermined pressure normally is sufficient to force the ground beef through outlet openings 32 and into mold cavities 51 of slide plate 50, the beef being discharged from each of the outlet openings may be under different pressures due to the varying distances of the beef supply in chamber 30 from inlet opening 31 where the applied predetermined pressure remains relatively constant. Such differences in pressure applied to the ground beef can cause the individual shaped patties formed by mold cavities 51 to vary significantly in size and weight. Since most customers who purchase preformed hamburger patties from food processing plants demand uniformity in size and weight, such variances are unacceptable.

Thus, each piston 41 is independently pneumatically controlled by placing each of the pistons under a certain pressure by the passage of air from a pressurized air source, through separate conduits, and into cylinders 40. This certain pressure is less than the predetermined pressure applied to the ground beef by the pressure feed pump. Thus, each piston 41 is pneumatically biased in the direction of chamber 30 and only applies pressure to the ground beef when the predetermined pressure applied to the portion of ground beef directly below the piston falls below the certain pressure of the piston. Thus, each piston could be at a different vertical height within its respective cylinder, since the pressure of the meat below each piston could be different. It should be emphasized that the individual control of each piston is important for this reason. Thus, the independent action of the pistons generally equalizes or balances the pressure applied to the ground beef being discharged at each of the outlet openings.

For example, and referring specifically to FIG. 2, assume that ground beef is being fed by a pressure feed pump through the right-hand inlet opening 31 of hopper 21. As the beef is pushed from right to left within chamber 30, it is possible that the predetermined pressure applied to the portion of beef below the far right-hand piston is greater than the certain pressure of the piston, so that the piston will remain in its upwardmost position. However, the pressure of the portions of beef below the other three pistons may each be less than the certain pressure of its respective piston, with the pressure of the beef portions decreasing in direct proportion to the distance of each beef portion from inlet opening 31. Thus, each of the other three pistons would move downwardly within its respective cylinder to apply the certain pressure to the beef portion therebelow for equalizing the pressure thereon with the pressure applied to the beef in other parts of hopper 21. Moving from right to left, the three pistons would be positioned in descending height, resulting in generally equal pressures being applied to the beef at each outlet opening 32. It is understood that this example merely is illustrative of one likely circumstance that might arise when processing a formable material in apparatus 1, and that other scenarios are possible.

When slide plate 50 is in the first position as shown in FIG. 3, the first set of mold cavities 51 is aligned with outlet openings 32 of hopper 21. Ground beef is forced into the mold cavities under the pressure applied thereto by the pressure pump and/or the pressure equalizing pistons 41. Enough pause or delay is present in drive system 75 due to the heretofore-described action of the cam follower 79 within cam slot 82 of slide carriage 83, to provide ample time for filling of the mold cavities. After filling of mold cavities 51, slide plate 50 moves to the second position as shown in FIG. 4 where mold cavities 51 are aligned with knockout plungers 60. During the pause of the slide plate in this second position, knockout cups 62 of plungers 60 move from the upward retracted position downwardly to an extended or eject position within mold cavities 51 to eject the individual food portions therefrom. This downward extension of the plungers into the mold cavities is caused by the above-described abrupt dropping of first end 105 of cam lever 104 off of peripheral edge 103 of rotating wheel 78 and into notch 102. Simultaneously with this knockout action, mold cavities 52 are being filled with beef from hopper 22. The slide plate then moves back to the first position as shown in FIG. 5 for refilling of mold cavities 51 and the simultaneous ejection of the individual shaped ground beef portions from slide plate mold cavities 52 which are aligned with plungers 60.

Conveyor belt 65 continuously carries the ejected patties from the common drop area directly below knockout plungers 60 and to a subsequent step in the food processing operation such as breading, cooking, frying, packaging, or freezing in a freezer tunnel.

It is understood that the number of knockout plungers, discharge openings and pressure balancing pistons per hopper, and mold cavities per set, in the embodiment shown is four each, but other numbers could be used with the food molding apparatus of the invention without effecting the concept thereof.

Again, the important features of the present invention include the manner in which the hopper pistons operate independently to equalize or balance the pressure applied to the formable material being discharged at each of the outlet openings of the hoppers and into the mold cavities of the slide plate. It is this pressure balancing which produces individual shaped portions of uniform size and weight, which result is most important to customers such as fast food chains and restaurants for maintaining consistency in their products which the consumer has come to expect. Another key feature of the invention is the tandem hoppers together with the reciprocating slide plate formed with two sets of mold cavities, which enables one set of mold cavities to be filled with formable material while the other set of mold cavities is having shaped product portions ejected therefrom by a set of knockout plungers.

Still another important feature is that the ejected portions drop onto the conveyor belt at a common area for efficient, orderly conveyance of the product to a subsequent processing operation. Another key feature is the pause or dwell of the reciprocating slide plate at its first and second positions provided by the particular size relationship of the cam follower with respect to the cam slot of the drive system. This pause or lost motion feature provides time for filling one set of the mold cavities while simultaneously ejecting the formed food product from the other set of cavities.

In summary, the improved food portioning and molding apparatus of the present invention increases output while reducing stress on the apparatus, while also producing individual shaped portions of improved size and weight uniformity. The apparatus also quickly and efficiently carries the produced food portions to a subsequent step in the food processing operation. Moreover, the apparatus is versatile enough for use with formable materials other than food products and can be used to simultaneously produce two different formable food products and/or formable materials. The apparatus of the invention is relatively inexpensive, durable in use, easy to operate, clean and maintain, compact, and is capable of processing formable food products and other formable materials at a wide range of temperatures. The apparatus also is designed to be properly positioned in a processing line without regard to the side of the line or which the formable material feed lines are positioned.

Accordingly, the food molding and portioning apparatus of the invention is simplified, provides an effective, safe, inexpensive, and efficient apparatus which achieves all the enumerated objectives, provides for eliminating difficulties encountered with prior apparatus, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved food molding and portioning apparatus is constructed and used, the characteristics of the construction, and the advantageous, new and useful results obtained; the new and useful structures, devices, elements, arrangements, parts and combinations, are set forth in the appended claims.

We claim:

1. A molding and portioning apparatus for processing formable materials, said apparatus including:
   (a) at least one hopper formed with at least one inlet opening for charging the hopper with a formable material by applying a first pressure to said material, and a plurality of outlet openings for discharging the material from the hopper;
   (b) means for generally equalizing the first pressure applied to the material for discharging said material from each of the outlet openings of the hopper, said pressure equalizing means being a plurality of pistons slideably mounted within a plurality of cylinders which communicate with the hopper and are aligned with and opposite of the outlet openings of said hopper, and means for applying a second pressure to the pistons for independently biasing said pistons in the direction of the outlet openings wherein said second pressure is less than the first pressure applied to the formable material within the hopper;
   (c) a forming plate formed with at least a first set of mold cavities and being movable between a first position and a second position, said mold cavities being alignable with the outlet openings of the hopper when the forming plate is in the first position, for receiving and molding the discharged formable material into individual portions of generally uniform size and weight;
   (d) knockout means alignable with the mold cavities of the forming plate when said plate is in the second position, said knockout means being movable between a retracted position and an extended position for ejecting the individual portions of the molded material from the mold cavities; and
   (e) drive means for synchronously moving the forming plate between the first and second positions and the knockout means between the retracted and extended positions.

2. The apparatus defined in claim 1 which includes a first hopper and a second hopper mounted in a spaced relationship; and in which the knockout means is mounted intermediate of and an equal distance from the outlet openings of each of the hoppers.

3. The apparatus defined in claim 1 in which the hopper is formed with a pair of opposite inlet openings.

4. The apparatus defined in claim 1 in which each of the piston cylinders communicates with a pressurized air source through a separate conduit for applying the second pressure to the pistons for independently pneumatically controlling each of the pistons.

5. The apparatus defined in claim 1 in which the knockout means is a plurality of plungers each comprising a rod and a knockout cup; and in which the outside diameter of the knockout cups is slightly less than the inside diameter of the mold cavities.

6. The apparatus defined in claim 1 in which the drive means is a motor having a first drive shaft and a second drive shaft which are operatively connected to a disk and a wheel, respectively, for rotating said disk and wheel; in which a cam follower is eccentrically mounted on the disk and moves along a generally oval-shaped cam slot formed in a slide carriage, for transforming the rotary motion of the disk into a reciprocating motion of the slide carriage; and in which the slide carriage is operatively connected to the forming plate through a series of meshing rack and pinion gears for transmitting the reciprocating motion of the slide carriage to the forming plate.

7. A molding and portioning apparatus for processing formable materials, said apparatus including:
  (a) first and second hoppers mounted in a spaced relationship, said hoppers each being formed with at least one inlet opening for charging the hopper with a formable material by applying a predetermined pressure to said material, and a plurality of outlet openings for discharging the material from the hopper;
  (b) a slide plate formed with first and second spaced sets of mold cavities, said slide plate reciprocating between a first position and a second position, said first and second sets of mold cavities being alignable with the outlet openings of the first and second hoppers, respectively, when the slide plate is in the first and second positions, for receiving and molding the discharged formable material into individual portions of generally uniform size and weight;
  (c) knockout means mounted intermediate of and an equal distance from the outlet openings of each of the hoppers, wherein said distance is equal to a distance between the sets of mold cavities, said knockout means being movable between a retracted position and an extended position for ejecting the individual portions of the molded material from the mold cavities, so that when the slide plate is in the first position the first set of mold cavities is aligned with the outlet openings of the first hopper and the second set of mold cavities is aligned with the knockout means, and when the slide plate is in the second position the second set of mold cavities is aligned with the outlet openings of the second hopper and the first set of mold cavities is aligned with the knockout means, for alternately filling the respective sets of mold cavities with the formable material as the individual portions of the molded material are being ejected from the other set of mold cavities;
  (d) means located below the slide plate for receiving the ejected individual portions of the molded material at a common area; and
  (e) drive means for synchronously reciprocating the slide plate between the first and second positions and the knockout means between the extended and retracted positions.

8. The apparatus defined in claim 7 which includes means for generally equalizing the pressure applied to the material being discharged from each of the outlet openings of the hoppers 9. The apparatus defined in claim 8 in which the pressure equalizing means is a plurality of pistons slideably mounted within a plurality of cylinders which communicate with the hoppers and are aligned with and opposite of the outlet openings of said hoppers; in which a certain pressure is applied to the pistons for biasing said pistons in the direction of the hoppers; and in which the certain pressure applied to the pistons is less than the predetermined pressure applied to the formable material within the hoppers.

10. The apparatus defined in claim 9 in which each of the piston cylinders communicates with a pressurized air source through a separate conduit for independently pneumatically controlling each of the pistons.

11. The apparatus defined in claim 7 in which the drive means is a motor having a first drive shaft and a second drive shaft which are operatively connected to a disk and a wheel, respectively, for rotating said disk and wheel; in which a cam follower is eccentrically mounted on the disk and moves along a generally oval-shaped cam slot formed in a slide carriage, for transforming the rotary motion of the disk into a reciprocating motion of the slide carriage; and in which the slide carriage is operatively connected to the slide plate through a series of meshing rack and pinion gears for transmitting the reciprocating motion of the slide carriage to the slide plate.

12. The apparatus defined in claim 11 in which a length of a short axis of the oval-shaped cam slot is greater than a diameter of the cam follower for delaying the reciprocating motion of the slide plate at the first and second positions, to provide time for the alternate filling of the first and second sets of mold cavities, respectively, and the simultaneous ejection of the individual portions of the molded material from the second and first sets of mold cavities.

13. The apparatus defined in claim 11 in which the wheel is formed with first and second opposed notches in the periphery thereof; and in which the wheel is operatively connected to the knockout means through a series of connecting levers and arms for moving the knockout means between the retracted and extended positions synchronously with the movement of the slide plate between the first and second positions; and in which the knockout means is in the extended position when a certain one of the levers is engaged with the first and second notches of the wheel and the slide plate is in the first and second positions, respectively.

14. The apparatus defined in claim 11 in which the means for receiving the ejected individual portions of the molded material is a conveyor; and in which the second output shaft of the motor is operatively connected to the conveyor through a series of connecting belts and pulleys which continuously drive the conveyor for carrying said portions to a subsequent step in the material processing operation.

15. An apparatus for molding and portioning a formable material, including:
  (a) spaced first and second hoppers for receiving a supply of the formable material, said hoppers each having a plurality of outlet openings for discharging the material therefrom;
  (b) a slide plate formed with first and second spaced sets of mold cavities, said slide plate reciprocating between a first position and a second position, said first and second sets of mold cavities being alignable with the outlet openings of the first and second hoppers, respectively, when the slide plate is in the first and second positions, for receiving and molding the discharged formable material into individual portions of generally uniform size and weight;
  (c) knockout means alignable with the first and second sets of mold cavities of the slide plate when said plate is in the second and first positions, respectively, said knockout means being movable between a retracted position and an extended position for ejecting the individual portions of the molded material from the mold cavities;
  (d) drive means for synchronously reciprocating the slide plate between the first and second positions and the knockout means between the retracted and extended positions; and
  (e) means for generally equalizing the pressure applied to the material being discharged from each of the outlet openings of the hoppers.

16. The apparatus defined in claim 15 in which the knockout means is mounted intermediate of and an equal distance from the outlet openings of each of the hoppers, wherein said distance is equal to a distance between the sets of mold cavities, so that when the slide plate is in the first position the first set of mold cavities is aligned with the outlet openings of the first hopper and the second set of mold cavities is aligned with the knockout means, and when the slide plate is in the second position the second set of mold cavities is aligned with the outlet openings of the second hopper and the first set of mold cavities is aligned with the knockout means, for alternately filling the respective sets of mold cavities with the formable material as the individual portions of the molded material are being ejected from the other set of mold cavities.

17. The apparatus defined in claim 15 in which the pressure equalizing means is a plurality of pistons slideably mounted within a plurality of cylinders which communicate with the hoppers and are aligned with and opposite of the outlet openings of said hoppers; in which a certain pressure is applied to the pistons for biasing said pistons in the direction of the hoppers; and in which the certain pressure applied to the pistons is less than a predetermined pressure applied to the formable material within the hoppers.

18. The apparatus defined in claim 17 in which each of the piston cylinders communicates with a pressurized air source through a separate conduit for independently pneumatically controlling each of the pistons.

19. A molding and portioning apparatus for processing formable materials, said apparatus including:
   (a) first and second hoppers mounted in a spaced relationship, each hopper formed with at least one inlet opening for charging the hopper with a formable material by applying a predetermined pressure to said material, and a plurality of outlet openings in each hopper for discharging the material from the hopper;
   (b) means for generally equalizing the pressure applied to the material being discharged from each of the outlet openings of the hoppers;
   (c) a forming plate formed with at least a first set of mold cavities and being movable between a first position and a second position, said mold cavities being alignable with the outlet openings of one of the hoppers when the forming plate is in the first position, for receiving and molding the discharged formable material into individual portions of generally uniform size and weight;
   (d) knockout means mounted intermediate of and an equal distance from the outlet openings of each of the hoppers and alignable with the mold cavities of the forming plate when said plate is in the second position, said knockout means being movable between a retracted position and an extended position for ejecting the individual portions of the molded material from the mold cavities; and
   (e) drive means for synchronously moving the forming plate between the first and second positions and the knockout means between the retracted and extended positions.

20. The apparatus defined in claim 19 in which the forming plate is a slide plate having the first set and a second set of mold cavities formed therein in a spaced relationship, wherein a distance between the sets of mold cavities is equal to the distance between the knockout means and the outlet openings of each of the hoppers; and in which the slide plate reciprocates between the first and second positions, so that when the slide plate is in the first position the first set of mold cavities is aligned with the outlet openings of the first hopper and the second set of mold cavities is aligned with the knockout means, and when the slide plate is in the second position the second set of mold cavities is aligned with the outlet openings of the second hopper and the first set of mold cavities is aligned with the knockout means, for alternately filling the respective sets of mold cavities with the formable material as the individual portions of the molded material are being ejected from the other set of mold cavities.

21. A molding and portioning apparatus for processing formable materials, said apparatus including:
   (a) at least one hopper formed with a pair of opposite inlet openings for charging the hopper with a formable material by applying a predetermined pressure to said material, and a plurality of outlet openings for discharging the material from the hopper;
   (b) means for generally equalizing the pressure applied to the material being discharged from each of the outlet openings of the hopper;
   (c) a forming plate formed with at least a first set of mold cavities and being movable between a first position and a second position, said mold cavities being alignable with the outlet openings of the hopper when the forming plate is in the first position, for receiving and molding the discharged formable material into individual portions of generally uniform size and weight;
   (d) knockout means alignable with the mold cavities of the forming plate when said plate is in the second position, said knockout means being movable between a retracted position and an extended position for ejecting the individual portions of the molded material from the mold cavities; and
   (e) drive means for synchronously moving the forming plate between the first and second positions and the knockout means between the retracted and extended positions.

22. A molding and portioning apparatus for processing formable materials, said apparatus including:
   (a) at least one hopper formed with at least one inlet opening for charging the hopper with a formable material by applying a predetermined pressure to said material, and a plurality of outlet openings for discharging the material from the hopper;
   (b) means for generally equalizing the pressure applied to the material being discharged from each of the outlet openings of the hopper;
   (c) a forming plate formed with at least a first set of mold cavities and being movable between a first position and a second position, said mold cavities being alignable with the outlet openings of the hopper when the forming plate is in the first position, for receiving and molding the discharged formable material into individual portions of generally uniform size and weight;
   (d) knockout means alignable with the mold cavities of the forming plate when said plate is in the second position, said knockout means being movable between a retracted position and an extended position for ejecting the individual portions of the molded material from the mold cavities; and
   (e) drive means for synchronously moving the forming plate between the first and second positions and the knockout means between the retracted and extended positions, said drive means including a motor having a first drive shaft and a second drive shaft operatively connected to a disk and a wheel, respectively, for rotating said disk and wheel, and a cam follower eccentrically mounted on the disk movable along a generally oval-shaped cam slot formed in a slide carriage for transforming the rotary motion of the disk into a reciprocating motion of the slide carriage, with the slide carriage being operatively connected to the forming plate through a series of meshing rack and pinion gears for transmitting the reciprocating motion of the slide carriage to the forming plate.

23. The apparatus defined in claim 22 in which a length of a short axis of the oval-shaped cam slot is greater than a diameter of the cam follower for delaying the reciprocating motion of the forming plate at the first and second positions, to provide time for the filling of the first set of mold cavities and the ejection of the individual portions of the molded material therefrom, respectively.

24. The apparatus defined in claim 22 in which the wheel is formed with at least one notch in the periphery thereof; and in which the wheel is operatively connected to the knockout means through a series of connecting levers and arms for moving the knockout means between the retracted and extended positions synchronously with the movement of the forming plate between the first and second positions; and in which the knockout means is in the extended position when a certain one of the levers is engaged with the notch of the wheel.

25. The apparatus defined in claim 22 in which conveyor means is located below the forming plate for catching the ejected individual portions of the molded material at a common drop area and carrying said portions to a subsequent step in the material processing operation.

26. The apparatus defined in claim 25 in which the second drive shaft of the motor is operatively connected to the conveyor means through a series of connecting belts and pulleys for continuously driving the conveyor means.

* * * * *